June 20, 1933.　　　　　　J. BALTON　　　　　　1,915,211
ROLLED CONE WAFER BAKING MOLD
Filed Nov. 23, 1932　　　　2 Sheets-Sheet 1
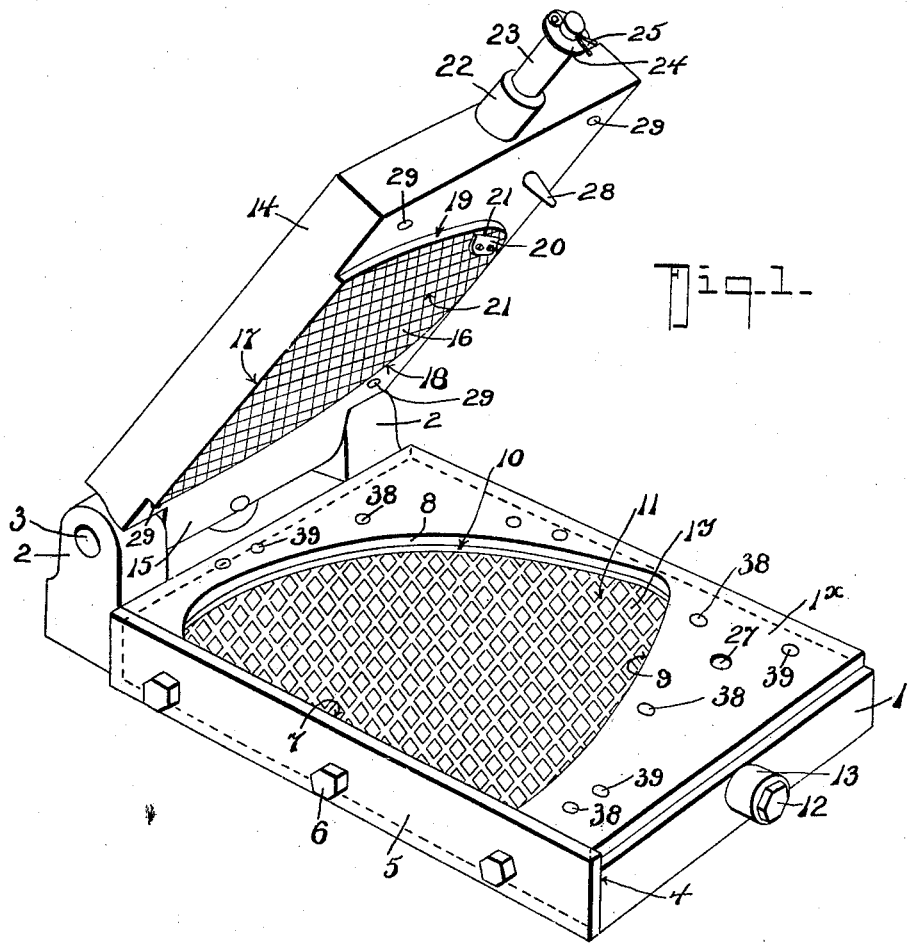
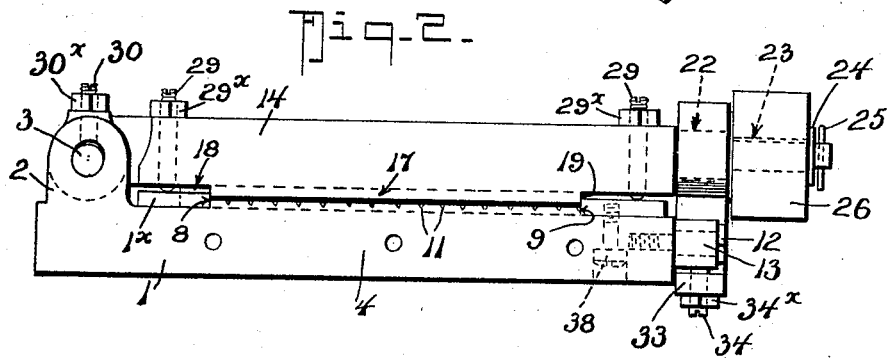
Inventor
James Balton
By Albert E. Dieterich
Attorney

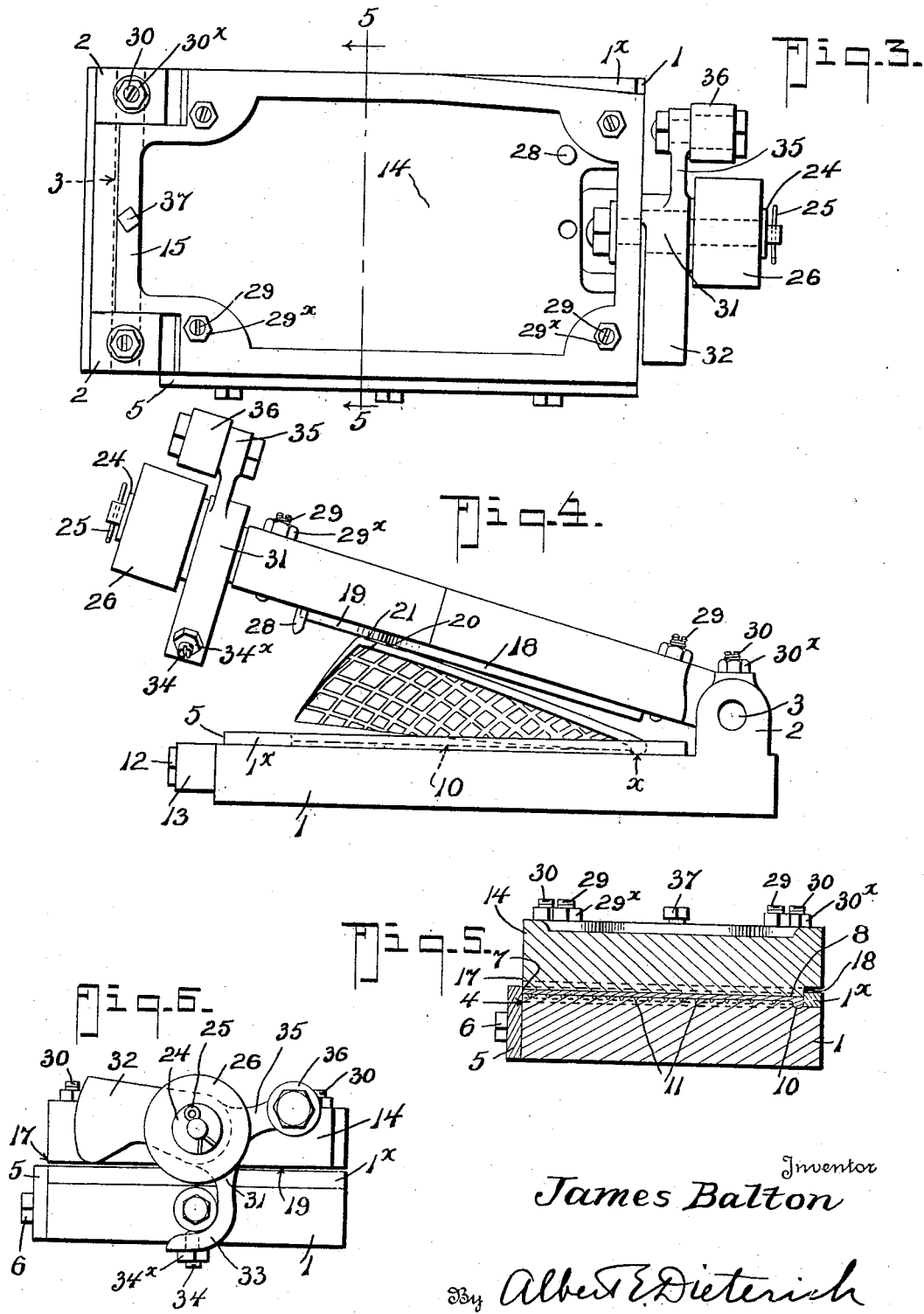

Patented June 20, 1933

1,915,211

UNITED STATES PATENT OFFICE

JAMES BALTON, OF BALTIMORE, MARYLAND, ASSIGNOR TO JOSEPH SHAPIRO, OF BALTIMORE, MARYLAND

ROLLED CONE-WAFER BAKING MOLD

Application filed November 23, 1932. Serial No. 644,105.

My invention relates to the art of pastry baking and particularly to the manufacture of so-called ice cream cones. Ice cream cones are of two general classes, the molded type in which the conical form is given to the batter during the process of baking by means of male and female molds, and the rolled type in which the batter is baked as a flat wafer disk and then rolled upon a conical mandril while still hot and pliable. It is to the latter type of cone manufacture that my invention is directed.

Prior to my invention it has been, so far as I am aware, the universal practice to bake the cone-wafer between two flat plates by depositing a quantity of liquid batter on the surfaces of the lower plate and bringing the upper plate down on the batter to squeeze it into a flat shape. In all such machines with which I am acquainted the resultant wafer has more or less ragged edges and is somewhat of the appearance of a pan-cake. This leaves a more or less rough edge to the finished cone when the wafer is rolled around the conical mandril.

To bake a thin cone-wafer confined in the cavity of a male and female mold and yet be able to get the baked wafer out of the mold pocket without breakage has been a difficult problem, one which I have, however, solved with my present invention.

With the above problem in view it has been an object of my invention to provide a solution in as simple, effective and inexpensive way as possible, and to that end I have provided a mold of the male and female type with means whereby the flat wafer can be molded in a definitely confined space so shaped as to enable the easy discharge of the wafer and its detachment from the molding surfaces in a uniform way by mechanical means of the simplest order.

Further, it is an object of the invention to provide a mold which can be used in an automatic wafer baking machine of the type disclosed in my application filed December 10, 1931, Serial No. 580,167.

Other objects will in part be obvious and in part be pointed out hereinafter.

To the attainment of the aforesaid objects and ends, my invention consists in the novel features of construction, combination and arrangement of parts hereinafter more fully described, and then pointed out in the appended claims, reference being had to the drawings, in which:

Figure 1 is a perspective view of a mold unit constructed in accordance with my invention, the latch and the plate lifting roller being omitted.

Figure 2 is a side elevation of the mold plate in the closed position.

Figure 3 is a top plan of the mold shown in Figure 2.

Figure 4 is a side elevation of the mold shown in Figure 2 and illustrating the way in which the cone-wafer is detached from the baking surfaces during the opening of the molds.

Figure 5 is a cross section on the line 5—5 of Figure 3.

Figure 6 is a front elevation of the mold as shown in Figure 2.

Figure 7 is an enlarged detail section of the wafer interlocking device.

In the drawings, in which like numerals of reference indicate like parts in all of the figures, 1 represents the base mold plate which is in general of rectangular form and has upstanding ears 2 at one end. The openings of these ears are slightly elongated and receive the hinge pin 3 which is secured by a set screw 37 in the hinge ear 15 of the upper mold plate 14.

The lower mold plate 1 has a straight edge 4 against which is secured a straight edge plate 5 that stands up above the top face of the mold plate 1 and cooperates with a rim plate 1x that is secured to the mold plate 1 by suitable screws 38 entering from the underside of the mold plate, there being suitable dowels 39 provided between the plates 1 and 1x in order to prevent movement of these two plates on one another and to prevent buckling of the rim plate due to the expansion and contraction while in operation.

The mold plate 1 is provided with a baking face 1y, this baking face constituting the bottom of a recess or female chamber formed by the straight edge 7 of the plate 5 and the curved edges 8 and 9 of the rim plate 1x.

The rim plate 1x and the plate 5 are preferably made of iron or steel while the mold plates 1 and 14 are preferably made of aluminum.

The plate 5 is secured to the mold plate 1 by cap screws 6, as shown.

Adjacent to the longer curved edge 8 of the female mold cavity there is provided in the molding face 1y a relatively deep groove 10, while shallower design grooves 11 (in the illustration they are shown as crossed grooves) are provided on the molding face 1y.

12 is a stud secured on the end of the plate 1 that is opposite the hinge end and the stud 12 carries a roller 13 to cooperate with the finger 33 of the latch 31 hereinafter referred to.

14 is the upper or hinged mold plate and this plate carries a protuberance 16 which is also of triangular form in plan view, and is of a size snugly to fit within the recess of the lower plate. Like the recess of the lower plate the protuberance 16 is provided with a straight edge 17, a relatively long curved edge 18 and a relatively short curved edge 19, thus giving in plan view a generally triangular shape.

The baking face of the protuberance 16 is preferably criss-crossed with fine shallow grooves 21. They may be made by simply scratching lines over the baking face. Thus, the baking face of the mold plate 14 has a lesser tendency to cause adherence of the batter thereto than has the baking surface 1y. This assures a greater adherence of the batter to the lower baking plate than to the surface of the upper baking plate. The upper baking plate, however, carries a wafer-interlocking device 20 which is located preferably adjacent to the apex of the triangle formed by the juncture of the sides 18 and 19. This device 20 is a thin metal plate having an undercut edge 21 into which some of the batter is squeezed or flows and is interlocked with the device 20 at this place. Since the degree of adhesion of the batter to the baking face of the protuberance 16 is less (save for the interlocking at 21) than the adhesion to the baking face 1y, it is obvious that as the molds begin to open the baked wafer will be detached from the baking face of the protuberance except at the point where it is interlocked at 21. Since it is interlocked at 21, it will be stripped from the baking face 1y during the initial part of the opening operation (see Figure 4) and owing to the difference in the distance between the center 3 and the interlocking point 21, in Figure 4, and the distance between that point and the point x in Figure 4, as the mold plates separate to their widest limit the interlocking of the wafer with the device 20 will be broken, leaving the wafer free to drop out of the mold by the time the mold reaches the discharge station in the machine, at which time the mold will be tilted to stand, as it were, on its side.

On the upper mold plate there is a stud which has a bearing 22 for the latch 31 and a bearing 23 for the roller 26 that engages the cam track (not shown) of the baking machine for the purpose of opening and closing the molds automatically. The roller 26 and latch 31 are held in place by a washer 24 and cotter pin 25 held on the reduced extreme end of the stud.

27 is an aligning hole in the mold 1 and plate 1x into which an aligning pin 28 carried by the upper mold plate fits when the mold plates are together.

In order that the baking faces of the mold plates may be lined up parallelly and spaced greater or lesser distances apart, according to the thickness of wafer desired, I have provided the upper plate with four spacer screws 29 and jamb nuts 29x. The adjustment through the medium of the screws 29 is permitted because of the looseness of the hinge joint due to the elongation of the holes in the ears 2. In order, however, that after the mold plates have been adjusted by means of the screws 29 the hinge ends of the mold plates shall not separate when the latch is locked down I provide hinge pin stop screws 30 and jamb nut 30x on each ear 2 for the purpose of limiting the upward movement of the hinge pin 3.

31 designates the latch which is of a well known construction (see my application aforesaid) and it includes the counterweight 32, the locking finger 33, the latch catch screw 34 and its jamb nut 34x, the arm 35 and the operating roller 36, which is adapted to engage the locking and unlocking tracks (not shown) of the automatic baking machine.

The provision of the separate plates 5 and 1x facilitates the engraving of the mold face of the baking plate 1 as that engraving can be done while the plates 1x and 5 are removed.

It will be noted that the upper mold plate 14 carries no plate corresponding to the plate 5.

The straight edge 17 fits the inner side of the straight edge 7 and allows for a more free escape of steam and can take place around the edges 8, 18, 9, 19, when the mold is closed.

From the foregoing description, taken in connection with the accompanying drawings, it is thought the complete construction, operation and advantages of my invention will be readily understood by those skilled in the art.

What I claim is:

1. A wafer baking mold for rolled-type cones comprising two plates hinged together, one of said plates having a shallow flat recess of approximately uniform depth and of approximately triangular shape in plan view and having a baking face, the other plate having a correspondingly shaped flat protuberance provided with a baking face and formed to fit within the recess of the first plate, one of said plates having a series of coarse grooves over the baking face thereof and a larger and deeper groove extending along one side of the triangle, the other plate having a series of fine grooves in the baking face thereof.

2. A wafer baking mold for rolled-type cones comprising two plates hinged together, one of said plates having a shallow flat recess of approximately uniform depth and of approximately triangular shape in plan view and having a baking face, the other plate having a correspondingly shaped flat protuberance provided with a baking face and formed to fit within the recess of the first plate, one of said plates having a series of coarse grooves over the baking face thereof and a larger and deeper groove extending along one side of the triangle, the other plate having a series of fine grooves in the baking face thereof, and means on the plate which has the fine grooves for interlocking with a portion of the wafer to strip it from the baking surface of the other plate.

3. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side.

4. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side, the baking surfaces of said plates having sets of design grooves of less depth than that of the first mentioned groove.

5. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side, the baking surfaces of said plates having a set of design grooves of less depth than that of the first mentioned groove, the set of grooves of the baking face of the plate which has the protuberance being of less depth than the set of grooves of the baking face of the recessed plate.

6. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side, the plate having the protuberance being provided within the angle formed by the juncture of the two convexedly curved sides with means mechanically to interlock with the corresponding portion of a wafer being baked whereby upon opening the mold plates apart the wafer will be released from the recess.

7. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side, the baking surfaces of said plates having a set of design grooves of less depth than that of the first mentioned groove, the plate having the protuberance being provided within the angle formed by the juncture of the two convexly curved sides with means mechanically to interlock with the corresponding portion of a wafer being baked whereby upon opening the mold plates apart the wafer will be released from the recess.

8. A wafer baking mold for rolled-type cones comprising two plates each having a straight edge, one of said plates having a flat protuberance of approximately triangular form one side of which is a straight edge, the other two sides of which being convexly curved and one being shorter than the other, the other plate having a flat recess shaped to snugly receive and fit over the protuberance of the first plate, the recess, like the protuberance, being bound by a straight side and two convexly curved sides, one shorter than the other, said recess having a baking face of an area corresponding to the protuberance, the baking face of the second plate having a groove along the longer convexed side, the baking surfaces of said plates having a set of design grooves of less depth than that of the first mentioned groove, the set of grooves of the baking face of the plate which has the protuberance being of less depth than the set of grooves of the baking face of the recessed plate, the plate having the protuberance being provided within the angle formed by the juncture of the two convexly curved sides with means mechanically to interlock with the corresponding portion of a wafer being baked whereby upon opening the mold plates apart the wafer will be released from the recess.

9. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, and means on the upper plate mechanically to interlock with the wafer being baked whereby upon opening the mold plates apart the wafer will be released from the lower plate.

10. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, and means to adjust the distance between the plates proper thereby to adjust the thickness of the space between the opposed baking surfaces of the recess and protuberance.

11. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, the plate which has the recess also having a groove along its longer curved side and shallow grooves over the remainder of the baking face of the recess.

12. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, means to adjust the distance between the plates proper thereby to adjust the thickness of the space between the opposed baking surfaces of the recess and protuberance, the plate which has the recess also having a groove along its longer curved side and shallow grooves over the remainder of the baking face of the recess.

13. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, the plate which has the recess also having a groove along its longer curved side and shallow grooves over the remainder of the baking face of the recess, the other plate having grooves over the baking face of its protuberance of less depth than those of the recess.

14. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, means to adjust the distance between the plates proper thereby to adjust the thickness of the space between the opposed baking surfaces of the recess and protuberance, the plate which has the recess also having a groove along its longer curved side and shallow grooves over the remainder of the baking face of the recess, the other plate having grooves over the baking face of its protuberance of less depth than those of the recess.

15. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, the plate which has the recess also having a groove along its longer curved side and shallow grooves over the remainder of the baking face of the recess, and means on the protuberance to detach the baked wafer from the recessed plate upon separating the plates.

16. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, means to adjust the distance between the plates proper thereby to adjust the thickness of the space between the opposed baking surfaces of the recess and protuberance, the plate which has the recess also having a groove along its longer curved side and shallow grooves over the remainder of the baking face of the recess, and means on the protuberance to detach the baked wafer from the recessed plate upon separating the plates.

17. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, the plate which has the recess also having a groove along its curved side and shallow grooves over the remainder of the baking face of the recess, the other plate having grooves over the baking face of its protuberance of less depth than those of the recess, and means on the protuberance to detach the baked wafer from the recessed plate upon separating the plates.

18. A wafer baking mold for rolled-type cones comprising two plates, one having a flat shallow recess and the other having a flat shallow protuberance to fit within said recess, said protuberance and said recess each having a straight edge and two curved sides arranged in triangular form, one of said curved sides being longer than the other, means to hold said plates together in baking relation, means to adjust the distance between the plates proper thereby to adjust the thickness of the space between the opposed baking surface of the recess and protuberance, the plate which has the recess also having a groove along its longer curved side and shallow grooves over the remainder of the baking face of the recess, the other plate having grooves over the baking face of its protuberance of less depth than those of the recess, and means on the protuberance to detach the baked wafer from the recessed plate upon separating the plates.

19. A wafer baking mold for rolled-type cones comprising two plates each having a protuberance provided with a straight edge and two curved sides in the form of a triangle, a ridge plate surrounding the protuberance of one of said two plates on its two curved sides and a second straight edge plate secured to said one of said two plates to extend along the straight edge side of the protuberance thereof, whereby there is formed a recess in said one of said two plates into which the protuberance of the other of said two plates fits.

20. A wafer baking mold for rolled-type cones comprising two plates, means loosely hinging said plates together, means for adjusting the distance between said plates and maintaining them in the adjusted positions parallel to one another, means for adjusting the looseness of the hinge joint between said plates and a locking device on the ends of said plates opposite the hinge joint whereby said plates may be located together in their adjusted relation, one of said plates having a shallow flat recess, and the other having a correspondingly formed protuberance to fit in the recess substantially as shown and described.

21. A flat baking mold of the male and female type comprising an upper and a lower baking plate one of which has a flat shallow baking plate one and the other has a correspondingly shaped shallow protuberance to fit into the recess, the opposed faces of the protuberance and recess constituting confined baking faces when the plates are together, and means on one of the baking plates mechanically to interlock with the wafer being baked whereby upon opening the mold plates apart the wafer will be released from the other baking plate.

22. A flat baking mold of the male and female type for the baking of "rolled" cones comprising an upper and a lower baking plate one of which has a flat shallow recess and the other has a correspondingly shaped shallow protuberance to fit into the recess, the opposed faces of the protuberance and recess constituting confined baking faces when the plates are together, the plate which has the recess having its baking face grooved with relatively shallow design producing grooves and having a relatively deep marginal groove along an edge of the recess which forms the mouth or rim of the cone.

JAMES BALTON.